Oct. 24, 1939.  E. L. ALLGAIER  2,177,312
APPARATUS FOR TESTING THE OPERATION OF VEHICLE BRAKES
Filed Aug. 22, 1938
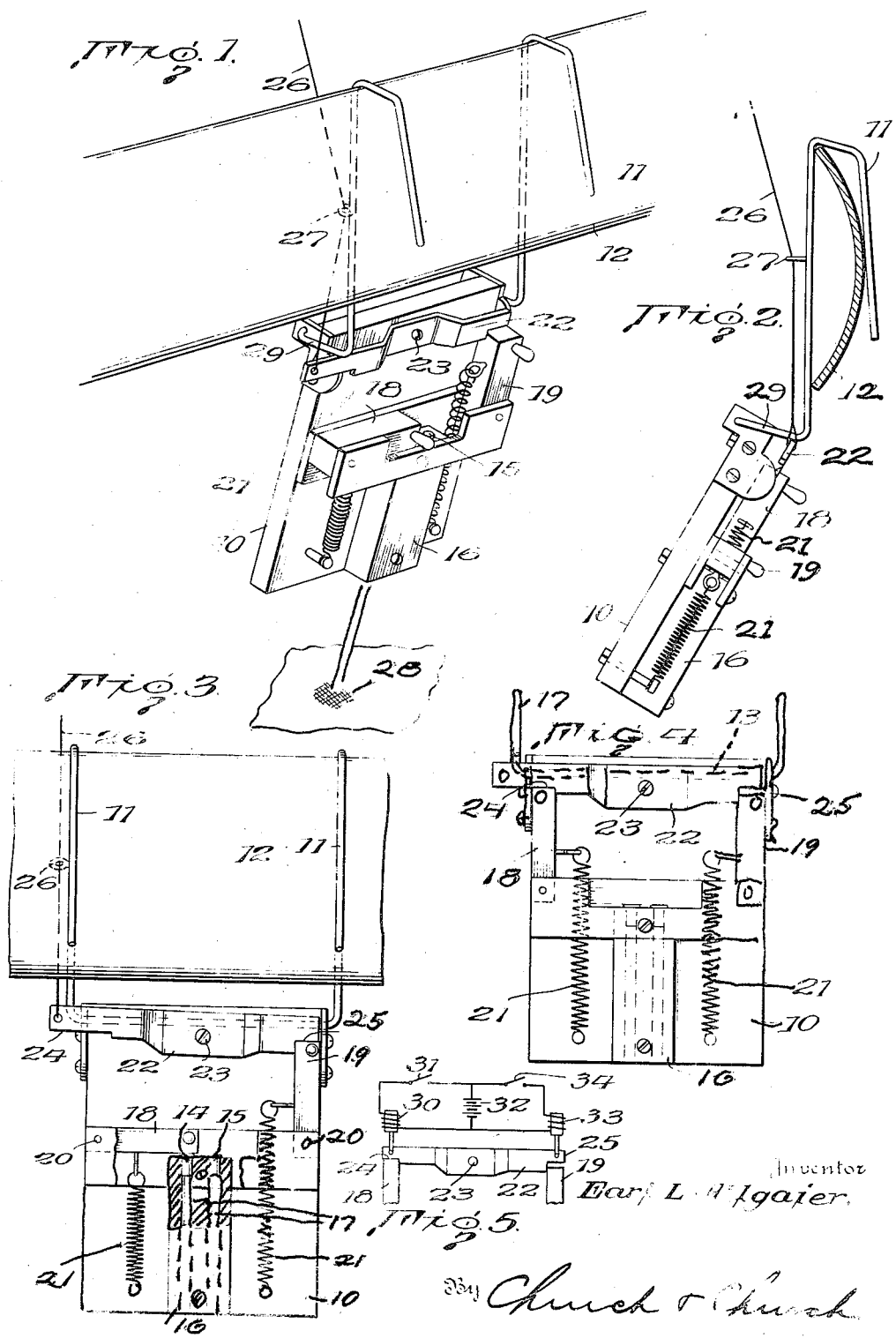
Inventor
Earl L. Allgaier
By Church & Church Patented Oct. 24, 1939

2,177,312

UNITED STATES PATENT OFFICE 2,177,312

APPARATUS FOR TESTING THE OPERATION OF VEHICLE BRAKES

Earl L. Allgaier, Washington, D. C., assignor to American Automobile Association, Inc., Washington, D. C., a corporation of Connecticut Application August 22, 1938, Serial No. 226,168

14 Claims. (Cl. 35—11)

This invention relates to a device for denoting the time element involved in applying the brakes of a vehicle, pursuant to a given signal. In addition, the present device may also be utilized in determining the distance required in bringing a vehicle to a full stop after the initial application of the vehicle brakes.

One object of the invention is to provide a mechanism with which a signal can be given to the operator of a vehicle for the latter to apply the brakes of the vehicle, the mechanism also including means for denoting when the operator has applied the brakes to reduce the speed of the vehicle. The interval between the time the signal is given and the time the brakes are applied will be an accurate indication of the mental reaction of the driver or operator of the vehicle. The instrument is, therefore, quite advantageous in connection with the examination of the student drivers, in that the instructor can give the signal to apply the brakes and thus determine the mental alertness of the student.

A further object of the invention is to provide a mechanism of the character described, in which the signal to apply the brakes is under the manual control of the individual accompanying the student driver, while the means for denoting the application of the brakes are responsive to the actuation of the brakes themselves, so that there is no mental effort on the part of the student in rendering this portion of the mechanism operative.

A still further object of the invention is to provide a mechanism of the character described, wherein the means for denoting the application of the brakes are maintained inoperative by the manually-controlled means for giving the signal to apply the brakes so that, in the event the student should apply the brakes before the signal is given, the entire mechanism will remain inoperative.

With these and other objects in view, the invention consists in certain details of construction and combinations and arrangements of parts, all as will hereinafter be more fully described, and the novel features thereof particularly pointed out in the appended claims.

In the accompanying drawing—

Figure 1 is a perspective view of the preferred embodiment of the invention, in which the mechanism comprises a plate freely suspended from the vehicle;

Fig. 2 is an edge view of the device shown in Fig. 1;

Fig. 3 is a front elevational view with a portion of the structure in section, the parts being shown in the position they occupy after the signal to apply the brakes has been given, but before the brakes have actually been applied;

Fig. 4 is a front elevational view with the device set or with the parts in position prior to the giving of the signal to apply the brakes; and Fig. 5 is a diagrammatic illustration of a modified arrangement for controlling the operation of the present device.

In the form of apparatus illustrated in Figs. 1 to 4, the signal to the operator to apply the brakes of the vehicle consists of a blank cartridge adapted to be fired by a manually-controlled mechanism, this manual control being exercised in the normal use of the device by the instructor or other person accompanying the student driver. When fired, under control of the instructor, the cartridge will impress a smudge upon the surface of the roadway traversed by the vehicle. Likewise, the means for denoting the initial application of the brakes comprise a second cartridge which will be fired by a mechanism responsive to the movement of the brakes and which second cartridge, when fired, will also form a smudge on the roadway, so that the distance between the two smudge marks on the roadway will denote the interval between the giving of the signal by the instructor and the initial application of the brakes by the student. As will also be appreciated, the distance between the second smudge formed on the roadway and the point at which the vehicle is brought to a full stop will denote the effectiveness or condition of the brakes of the vehicle.

In the preferred embodiment, the device comprises a plate 10 carried at a suitable point on the vehicle in such fashion as to be capable of swinging freely fore and aft of the vehicle. For instance, as shown in Fig. 1, a bail-like member may be provided with hook-shaped ends 11 engageable over the bumper 12 of the vehicle, the plate being freely swingable on the cross bar 13 of said bail member. The plate 10 is provided with means for supporting two blank cartridges 14, 15. These cartridge-supporting means may consist of a metal block 16 mounted on the plate 10 and formed with two passages or bores 17 adapted to receive the cartridges 14, 15, and disposed to discharge toward the road surface when the plate 10 is suspended on the vehicle.

Detonation of cartridges positioned in the bores 17 is effected by firing hammers 18, 19, pivotally mounted at 20 on plate 10. These hammers are forcibly, but yieldingly, urged toward the cartridges by springs 21. To "arm" the device, or to hold the firing hammers 18, 19, in position to be forcibly moved against the cartridges, as shown in Fig. 4, the plate 10 has pivoted thereon hammer-locking means which may take the form of a single latch 22 pivoted on said plate at 23 and having notched end portions 24, 25, in which notches the free ends of the hammers are adapted to engage when the hammers are turned on their pivotal centers from their cartridge-engaging position to a substantially perpendicular position. When thus latched in armed position, it will be seen that the firing hammer 18 prevents a downward movement of the notched end 24 of latch 22 such as will be necessary to raise the notched end 25 of the latch to free hammer 19. Thus, it might be said that the hammer 19 is locked against any possible operation until hammer 18 has been released. This is true because, after hammer 18 has been released, in a manner to be later described, the notched end 24 will then be free to be depressed sufficiently to raise notched end 25 of the latch to disengage the same from hammer 19.

In operation, the instructor desiring to ascertain the mental alertness of a student driver or person who may, perhaps, be taking a driving examination for the purpose of obtaining a license to operate automotive vehicles, will actuate latch 22 to free hammer 18, whereupon the latter will be forcibly impacted against cartridge 14 and the latter fired. Any form of manually-operable means may be provided for use of the instructor in actuating latch 22. In the present instance, there is illustrated a flexible cord-like connection 26, extending through an eye 27 on one of the hook members 11 and attached to the notched end 24 of the latch. Upon detonation of the blank 14, a smudge 28 will be produced on the roadway, as indicated diagrammatically in Fig. 1. Upon hearing the report of this detonation, the student is expected to apply the brakes of the vehicle and, when he takes this action, the deceleration of the vehicle body will cause the plate 10 to swing on the bail member 13. This swinging motion of the plate will cause the notched end 24 of the latch to engage the forwardly extending and more or less horizontally-disposed portion 29 of the bail member, and the latter, being fixed, will depress that end of the latch sufficiently to raise and disengage the opposite notched end 25 from the hammer 19. Hammer 19, being freed, will impact against and fire cartridge 15, with the result that a second smudge will be formed on the roadway. In other words, the mechanism for effecting detonation of the second cartridge is responsive to the reduction in speed of the vehicle due to the fact that, upon deceleration of the vehicle body, the freely swingable plate member 10 tends to maintain its momentum and moves or swings forwardly sufficiently to actuate latch 22, as just described.

As previously stated, it will be seen that the distance between the second smudge formed on the roadway and the point at which the vehicle comes to a stand-still will be a true criterion of the condition of the brakes of the vehicle.

The mechanics of the device illustrated in Figs. 1 to 4 are simple, inexpensive and sturdy. They not only operate efficiently, but there is very little, if any, likelihood of their becoming accidentally inoperative. However, another comparatively simple arrangement for controlling the operation of the device is illustrated in Fig. 5, wherein the latch 22 is capable of being rocked on its pivotal center 23 by electrically-operated devices. In this insance, the notched end 24 of the latch may be raised and freed from hammer 18 by a solenoid 30 which can be energized at the will of the instructor by closing switch 31 in the solenoid circuit, which also includes the battery 32. The opposite notched end 25 of the latch can likewise be raised and disengaged from hammer 19 by energizing solenoid 33, this occurring upon the closing of switch 34. It will be readily seen that switch 34 might be closed in various ways. It may be accomplished by the swinging motion of plate 10, or it can be accomplished by a mechanical connection with the brake-operating linkage.

The present appliance has met with considerable success in the examination of student drivers or applicants for driving licenses. As mentioned, it can be produced at a comparatively low cost and, in the preferred embodiment, can be readily installed on and removed from the vehicle. Also, as stated, the firing of the second cartridge is unconsciously accomplished, so to speak, by the student. It is only necessary that he apply the brakes, and the movement of the brakes, or deceleration of the vehicle body, will effect the detonation. In this way, the mental reaction of the student, in applying the brakes, pursuant to a signal, can be accurately determined. It is also believed that this mode of determining the student's mental reaction is quite comparable to emergencies apt to be encountered in driving under otherwise normal traffic conditions. That is, the detonation of the first cartridge by the instructor may catch the student unawares, or startle him, just as he would be caught unawares, or startled, upon an emergency suddenly arising while he is driving under normal traffic conditions.

In the present mechanism, the lag or interval between the instructor's signal to apply the brakes and the actual application of the brakes is denoted by distance or in units of length, as distinguished by distance or in units of length, as distinguished from units of time, or the lapse of time, but it will be appreciated that it is not limited to this particular mode of operation.

What I claim is:

1. In a device for testing the operation of vehicle brakes, the combination of means having two cartridge-receiving bores therein, said means being adapted to be supported on the vehicle with said bores directed toward the ground surface, a pair of firing hammers, manually operable means for releasing one of said hammers, and means responsive to a reduction in the speed of the vehicle for releasing the other hammer.

2. In a device for testing the operation of vehicle brakes, the combination of cartridge-supporting means comprising two bores, the detonation of a cartridge in one bore constituting a signal to apply the brakes and detonation of a cartridge in the other bore denoting application of said brakes, a spring-actuated hammer for each bore, a latch for releasably holding said hammers against operation, said latch being movable in one direction to release one hammer and movable in the opposite direction to free the second hammer, and means for preventing movement of the latch in said opposite direction in advance of the release of the first hammer.

3. In a device for testing the operation of vehicle brakes, the combination of two cartridge-receiving bores adapted to be directed toward a recording surface, said bores and said recording surface being adapted to be moved relatively to each other whereby, at any given rate of relative movement, the space between marks made on said surface by the firing of cartridges in said bores will denote the elapsed time between the successive firing of said cartridges, a spring-actuated firing hammer for each bore, a latch engageable with both of said hammers, manually controlled means for rocking said latch to release one hammer, and means responsive to application of the brakes in reducing the speed of the vehicle for actuating said latch to release the other hammer.

4. In a device for testing the operation of vehicle brakes, the combination of two cartridge-receiving bores adapted to be directed toward a recording surface, said bores and said recording surface being adapted to be moved relatively to each other whereby, at any given rate of relative movement, the space between marks made on said surface by the firing of cartridges in said bores will denote the elapsed time between the successive firing of said cartridges, a spring-actuated firing hammer for each bore, a rockable latch releasably engageable with said hammers, manually controlled means for rocking the latch in one direction to free one hammer, and means for rocking said latch in the opposite direction for freeing the other hammer, the operation of the last-mentioned means being dependent upon a reduction in the rate of speed of movement of the vehicle and the prior release of the first-mentioned hammer.

5. In a device for testing the operation of vehicle brakes, the combination of a plate, means for suspending said plate on a fixed portion of the vehicle, said plate being swingable longitudinally of the vehicle upon comparatively sudden application of said brakes, a member having a pair of cartridge-receiving bores on said plate, detonation of a cartridge in one bore constituting a signal to apply the brakes and the detonation of a cartridge in the other bore denoting the application of said brakes, a spring-actuated firing hammer for each bore, means for releasably holding said hammers against operation, and manually-controlled means for actuating said holding means to free one hammer, said holding means also being operable by a swinging motion of said plate in the direction of movement of the vehicle to release the other hammer after the release of the first-mentioned hammer.

6. In a device for testing the operation of vehicle brakes, the combination of supporting means for two cartridges adapted to be fired against the surface beneath the vehicle, firing mechanism for successively detonating said cartridges, said firing mechanism being manually controlled for firing one cartridge and responsive to a braking action reducing the speed of the vehicle to fire the other cartridge.

7. In a device for testing the operation of vehicle brakes, the combination of a plate, means for suspending said plate on the vehicle, said plate being free to swing relatively to said suspension means longitudinally of the vehicle body upon comparatively sudden application of said brakes, means for supporting cartridges on said plate, the firing of one cartridge constituting a signal to apply the brakes and the firing of a second cartridge denoting the application of said brakes, a spring-actuated firing hammer for each cartridge, latching means for releasably holding said hammers against operation, and manually-controlled means for actuating said latching means to free one hammer, said latching means also being operable upon a swinging movement of said plate in the direction of movement of the vehicle to free a second hammer after the freeing of the first-mentioned hammer.

8. In a device for testing the operation of vehicle brakes, the combination of a plate adapted to be pivotally suspended from the vehicle to swing longitudinally of the vehicle, means on said plate having bores for receiving two cartridges, said bores being disposed to discharge downwardly from the plate and vehicle, a spring-actuated hammer for each cartridge, a latch pivoted on said plate for releasably holding said hammers inoperative, manually-controlled means for rocking said latch to free one hammer, and means engageable with said latch upon a swinging movement of the plate to rock said latch and free the second hammer.

9. In a device for testing the operation of vehicle brakes, the combination of a plate adapted to be pivotally suspended from the vehicle to swing longitudinally of the vehicle, means on said plate for supporting a pair of cartridges directed toward the surface beneath the vehicle, the firing of one cartridge constituting a signal to apply the brakes and firing of the second cartridge denoting the application of the brakes, a firing hammer for each cartridge, means for releasably holding said hammer inoperative, manually-operated means for actuating said holding means to free one hammer, and means responsive to operation of the vehicle brakes in reducing the speed of the vehicle for actuating said holding means to free the other hammer after the first-mentioned hammer has been freed.

10. In a device for testing the operation of vehicle brakes, the combination of means for supporting a pair of cartridges, one to denote a signal to apply the brakes and the other to denote application of the brakes, a firing hammer for each cartridge, means for holding each hammer against operation, manually-controlled means for actuating said holding means to free one hammer, and a second means for actuating said holding means to free the second hammer, said second means being locked against operation by said manually-controlled means until the latter has been actuated to free the first hammer.

11. In a device for testing the operation of vehicle brakes, the combination of means for supporting a pair of cartridges, one to denote a signal to apply the brakes and the other to denote application of the brakes, a pair of firing hammers, means for holding said hammers against operation, manually-operable means for releasing one hammer, and means responsive to movement of the vehicle brakes in reducing the speed of the vehicle for releasing the second hammer, said brake-responsive means being locked against operation by said manually-operable means until the latter has been actuated to release the first hammer.

12. In a device for testing the operation of vehicle brakes, the combination of a plate pivotally carried by the vehicle and free to swing longitudinally thereof, means for supporting two cartridges on said plate, the firing of one cartridge constituting a signal to apply the brakes and the firing of the second cartridge denoting application of the brakes, normally inoperative hammers for firing said cartridges, manually-controlled means for rendering one hammer operative, and means operable by the swinging motion of said plate in the direction of movement of the vehicle for rendering the other hammer operative.

13. In a device for testing the operation of the brakes of a moving vehicle, the combination of means for rendering a signal to apply the brakes, and means for rendering a signal upon the application of said brakes, said last-mentioned means being responsive to and controlled by the application of the brakes in reducing the speed of the vehicle and operable only after the rendition of the signal to apply said brakes.

14. In a device for registering the mental alertness of drivers of vehicles in applying the brakes of the vehicle, the combination of manually-controlled means for visibly indicating on the road surface beneath the vehicle the rendition of a signal to the driver to apply the brakes and means for visibly indicating on said surface a signal denoting the application of the brakes, said last-mentioned means being responsive to the movement of brakes in reducing the speed of the vehicle and said last-mentioned means being interlocked with said manually-operable means to prevent operation of said last-mentioned means in advance of said manually-controlled means.

EARL L. ALLGAIER.